(12) United States Patent
Tsukio

(10) Patent No.: US 10,928,872 B2
(45) Date of Patent: Feb. 23, 2021

(54) ELECTRONIC CONTROL DEVICE

(71) Applicant: HITACHI AUTOMOTIVE SYSTEMS, LTD., Hitachinaka (JP)

(72) Inventor: Koichi Tsukio, Hitachinaka (JP)

(73) Assignee: HITACHI AUTOMOTIVE SYSTEMS, LTD., Hitachinaka (JP)

( * ) Notice: Subject to any disclaimer, the term of this patent is extended or adjusted under 35 U.S.C. 154(b) by 131 days.

(21) Appl. No.: 16/317,439

(22) PCT Filed: Jun. 22, 2017

(86) PCT No.: PCT/JP2017/022992
§ 371 (c)(1),
(2) Date: Jan. 11, 2019

(87) PCT Pub. No.: WO2018/016260
PCT Pub. Date: Jan. 25, 2018

(65) Prior Publication Data
US 2019/0302870 A1 Oct. 3, 2019

(30) Foreign Application Priority Data
Jul. 22, 2016 (JP) .............................. JP2016-144038

(51) Int. Cl.
*G06F 1/26* (2006.01)
*G06F 1/32* (2019.01)
*G06F 1/3234* (2019.01)

(52) U.S. Cl.
CPC ............... *G06F 1/26* (2013.01); *G06F 1/32* (2013.01); *G06F 1/3234* (2013.01)

(58) Field of Classification Search
CPC ............ G06F 1/26; G06F 1/32; G06F 1/3234
See application file for complete search history.

(56) References Cited

U.S. PATENT DOCUMENTS 5,935,254 A * 8/1999 Lee ........................... G06F 1/26
713/340
10,608,615 B2 * 3/2020 Kim ................... H03K 3/35625
(Continued)

FOREIGN PATENT DOCUMENTS

JP 5-205352 A 8/1993
JP 6-21785 A 1/1994
(Continued)

OTHER PUBLICATIONS

International Search Report, PCT/JP2017/022992 (dated Sep. 12, 2017).
(Continued)

*Primary Examiner* — Stefan Stoynov
(74) *Attorney, Agent, or Firm* — Foley & Lardner LLP

(57) ABSTRACT

Provided is an electronic control device configured to reduce power consumption of a power-supply activation device while maintaining driving of a power supply device. A control unit 18 (the electronic control device) includes an arithmetic device 8, a power supply device 5 which supplies power to the arithmetic device 8, a power-supply activation device 2 which activates the power supply device 5, a power supply maintaining signal line 9 (first signal line), and a reset signal line 11 (second signal line). The power supply maintaining signal line 9 (first signal line) transmits a power supply maintaining signal (power supply drive maintaining signal) for maintaining drive of the power supply device 5, from the arithmetic device 8 to the power supply device 5. The reset signal line 11 (second signal line) transmits a reset signal for resetting the power-supply activation device 2, from the arithmetic device 8 to the power-supply activation device 2.

5 Claims, 4 Drawing Sheets

(56) References Cited

U.S. PATENT DOCUMENTS

| | | | |
|---|---|---|---|
| 2004/0122565 A1 | 6/2004 | Sakurai et al. | |
| 2006/0170572 A1 | 8/2006 | Kurachi et al. | |
| 2014/0195081 A1* | 7/2014 | Kwak | B60L 53/18 |
| | | | 701/22 |

FOREIGN PATENT DOCUMENTS

| | | |
|---|---|---|
| JP | 1997-222938 A | 8/1997 |
| JP | 2004-197585 A | 7/2004 |
| JP | 2006-211346 A | 8/2006 |
| JP | 2014-002456 A | 1/2014 |
| JP | 2015-55912 A | 3/2015 |

OTHER PUBLICATIONS

Office Action issued in corresponding Japanese patent application No. 2018-528458 dated Oct. 29, 2019 with English translation.

* cited by examiner

ELECTRONIC CONTROL DEVICE

TECHNICAL FIELD

The present invention relates to an electronic control device.

BACKGROUND ART

A technique is known to turn on/off power supplied to a system or the like by using a flip-flop (hereinafter referred to as F/F or FF) (e.g., see PTLs 1 to 3).

In PTL 1, "a state detection F/F outputs a switch detection signal of H-level to a CPU by switching operation in turning on or off power as the first trigger. A power control F/F changes a power supply control signal to an H-level by the switching operation as the first trigger when power is turned on, and when power is turned off, the power control signal is changed to an L-level by reset control (second reset signal) of the CPU. The CPU monitors the state of a chattering monitoring signal. When the CPU detects that the state of the signal is stabilized, the CPU controls the state detection F/F to be reset upon turning on power and controls the power supply control F/F to be reset upon turning off power, changing the levels of the state detection F/F and the power supply control F/F to the L level".

PTL 2 describes "a power supply activation circuit includes a D-flip-flop with a reset function disposed between an operation switch SW 1 and a DC-DC converter".

In PTL 3, "a latch circuit transmits an activation signal by pressing of a push button switch, and a central processing unit (CPU) is activated by the activation signal to execute predetermined processing. Chattering occurs when the push button switch is pushed or released, but the CPU resets the latch circuit after a predetermined time elapses from when the predetermined process is finished".

CITATION LIST

Patent Literature

PTL 1: JP 1997-222938 A
PTL 2: JP H05-205352 A
PTL 3: JP H06-21785 A

SUMMARY OF INVENTION

Technical Problem

In such a technique as disclosed in PTL 1, a holding circuit such as a D-FF with reset has both functions of a power-supply activation device and a power supply maintaining device for a power supply device. Thus, power supply for the power supply device is stopped in conjunction with resetting the holding circuit. For this reason, it is necessary to continuously operate the holding circuit while the power supply device supplies power, and the holding circuit always consumes current during power is supplied from the power supply device.

In such a technique as disclosed in PTL 2 as well, as described above, since a holding circuit has both functions of a power-supply activation device and a power supply maintaining device for a power supply device, the holding circuit always consumes current during power is supplied.

In such a technique as disclosed in PTL 3, since reset timing of a holding circuit is determined by a timer or the like, it is not possible to reset the holding circuit by an external factor.

An object of the present invention is to provide an electronic control device configured to reduce power consumption of a power-supply activation device while maintaining driving of a power supply device.

Solution to Problem

In order to achieve the above object, the present invention includes an arithmetic device, a power supply device for supplying power to the arithmetic device, a power-supply activation device for activating the power supply device, a first signal line for transmitting a power supply drive maintaining signal for maintaining drive of the power supply device, from the arithmetic device to the power supply device, and a second signal line for transmitting, from the arithmetic device to the power-supply activation device, a reset signal for resetting the power-supply activation device.

Advantageous Effects of Invention

According to the present invention, it is possible to reduce the power consumption of the power-supply activation device while maintaining the drive of the power supply device. Problems, configurations, and effects other than those in the above description will be made clear in the following description of the embodiments.

DESCRIPTION OF EMBODIMENTS

Figure 1:
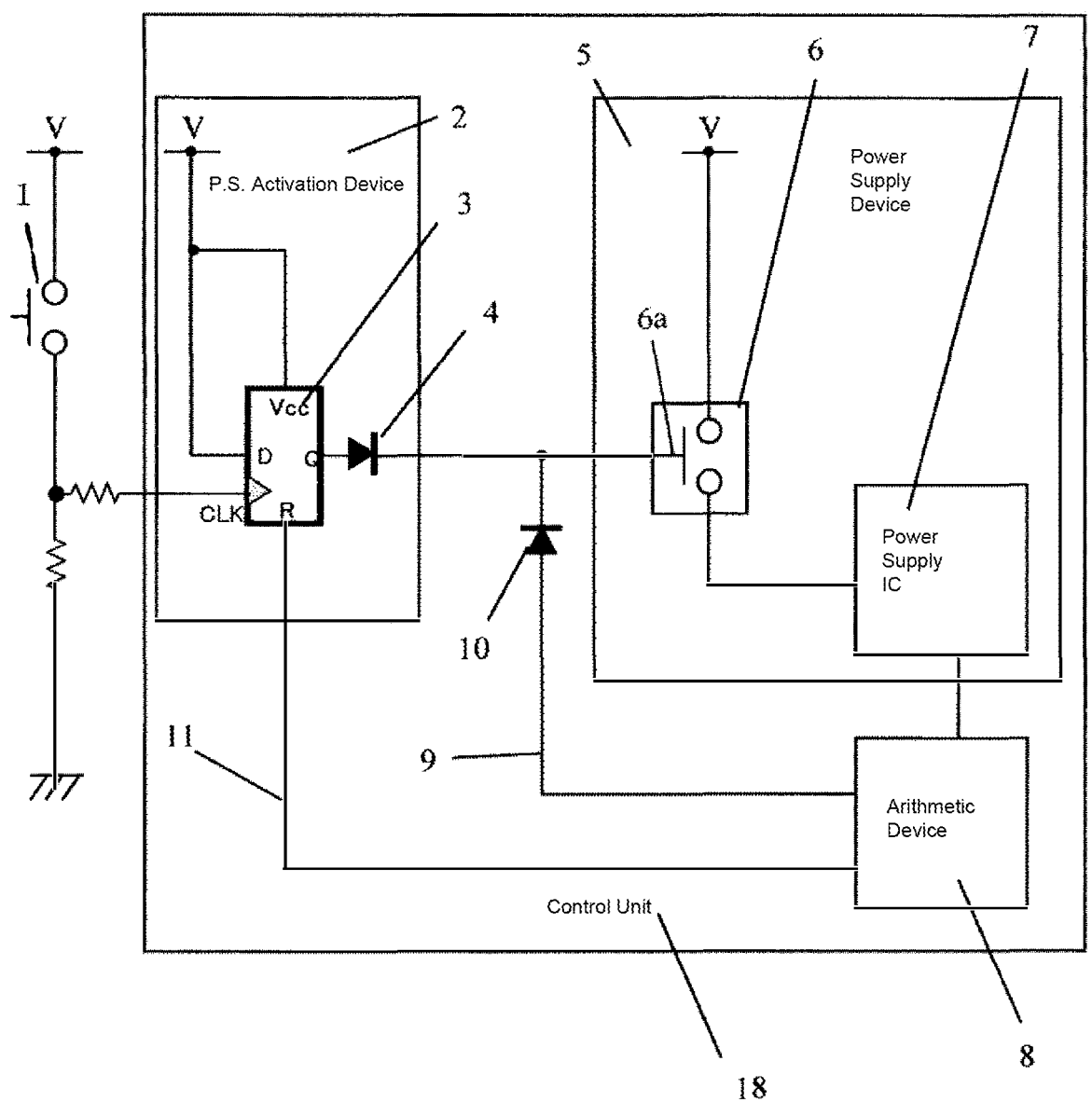
FIG. 1 is a diagram illustrating a circuit configuration according to a first embodiment of the present invention.

Hereinafter, the configuration and operation of an electronic control device according to the first and second embodiments of the present invention will be described with reference to the drawings. In the drawings, the same reference numerals denote the same portions.

First Embodiment

Figure 2:
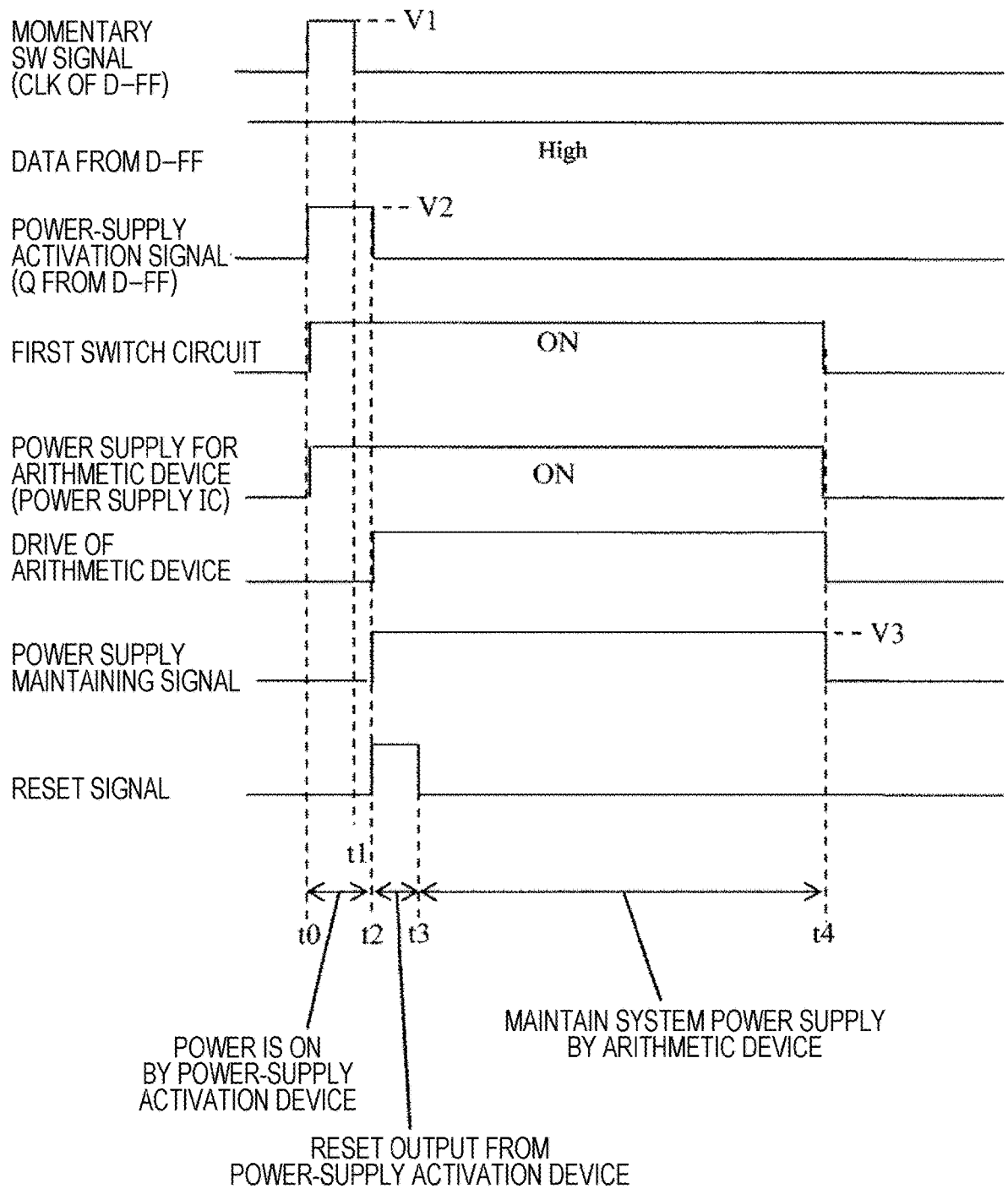
FIG. 2 is a timing chart according to the first embodiment of the present invention.

FIG. 1 illustrates a circuit configuration of a control unit 18 (the electronic control device) according to a first embodiment of the present invention, and FIG. 2 is a timing chart to implement FIG. 1.

When a momentary switch 1 outside the control unit 18 is turned on (timing t=t0, FIG. 2), potential V1 upstream of the momentary switch 1 is applied to a clock input portion CLK of a D-FF (D type flip-flop) 3 while the momentary switch 1 is turned on (t0≤t≤t1). At this time, since a data input portion D of the D-FF 3 is connected to a power supply, the potential V1 generated from the momentary switch 1 is recognized as a clock by the clock input portion CLK of the D-FF 3 and data is latched, and an output Q of the D-FF 3 is held at a constant potential V2.

In other words, a power-supply activation device 2 outputs a power-supply activation signal for activating a power supply device 5, to the power supply device 5, on the basis of the potential V1 (input signal from outside) generated by the momentary switch 1. Specifically, the power-supply activation device 2 includes the D-FF 3 (logic circuit) for holding and outputting the power-supply activation signal in synchronization with an input signal from outside, and resetting the held power-supply activation signal in synchronism with a reset signal.

Here, even after the momentary switch 1 is turned off (t1≤t), the potential of the output Q does not change unless the D-FF 3 is reset or power supply to the D-FF 3 is stopped. The output Q of the D-FF 3 is connected to a first switch circuit 6 which is a constituent portion of the power supply device 5 via a first current direction limiting diode 4, and when the output Q of the D-FF 3 is the constant potential V2 (t=t0), a switch of the first switch circuit 6 is turned on, and power is supplied to a power supply IC 7. In this way, the power-supply activation device 2 activates the power supply device 5.

When the first switch circuit 6 is turned on, the power supply IC 7 receives power supply, and the power supply IC 7 supplies the power (electric power) to an arithmetic device 8. In other words, the power supply device 5 supplies power to the arithmetic device 8 during a period in which the power-supply activation signal is input.

The arithmetic device 8 activated by receiving power supply from the power supply IC 7 changes a power supply maintaining signal line 9 for connecting the arithmetic device 8 and the first switch circuit 6 via a second current direction limiting diode 10, to potential V3 (for example, V3=V2 is possible) for turning on the first switch circuit 6, that is, the arithmetic device 8 outputs the power supply maintaining signal (t=t2). Thus, power supply from the power supply device 5 is maintained by the arithmetic device 8 (t2≤t≤t4).

In other words, the power supply maintaining signal line 9 (first signal line) transmits the power supply maintaining signal (power supply drive maintaining signal) for maintaining drive of the power supply device 5, from the arithmetic device 8 to the power supply device 5. The power supply device 5 supplies electric power to the arithmetic device 8 during a period in which the power supply maintaining signal (power supply drive maintaining signal) is input. More specifically, the power supply device 5 includes a first switch circuit 6 (first switch) including a first control terminal 6a to which the power-supply activation signal and the power supply maintaining signal (power supply drive maintaining signal) are applied to turn on/off electric power supplied to the power supply device 5 in accordance with the potential of the first control terminal 6a.

The arithmetic device 8 and a reset R of the D-FF 3 are connected by a reset signal line 11, and the arithmetic device 8 maintaining the operation of the power supply device 5 then uses the reset signal line 11 to output a reset signal to the D-FF 3 (t2≤t≤t3), and resets a holding signal (power-supply activation signal) in the power-supply activation device 2.

In other words, the reset signal line 11 (second signal line) transmits the reset signal for resetting the power-supply activation device 2 from the arithmetic device 8 to the power-supply activation device 2. When the reset signal is input, the power-supply activation device 2 stops to output the power-supply activation signal. The arithmetic device 8 activated with power supplied from the power supply device 5, outputs a power supply maintaining signal (power supply drive maintaining signal) to the power supply device 5 and outputs the reset signal to the power-supply activation device 2.

The first current direction limiting diode 4 and the second current direction limiting diode 10 are elements for preventing current from flowing back to the output Q of the D-FF 3 and to the arithmetic device 8, respectively.

In the present embodiment, the device is required to activate the power supply device 5 and arithmetic device 8 of the control unit 18, which are stopped, by the trigger from outside (from the momentary switch 1). The device is on standby while monitoring the trigger from outside by only driving the power-supply activation device 2, and when the power supply device 5 and the arithmetic device 8 are activated, the holding signal (power-supply activation signal) in the power-supply activation device 2 becomes unnecessary and is reset. Therefore, the current consumption of the power-supply activation device 2 can be reduced.

As described above, according to the present embodiment, it is possible to reduce the power consumption of the power-supply activation device 2 while maintaining the drive of the power supply device 5.

Second Embodiment

Figure 3:
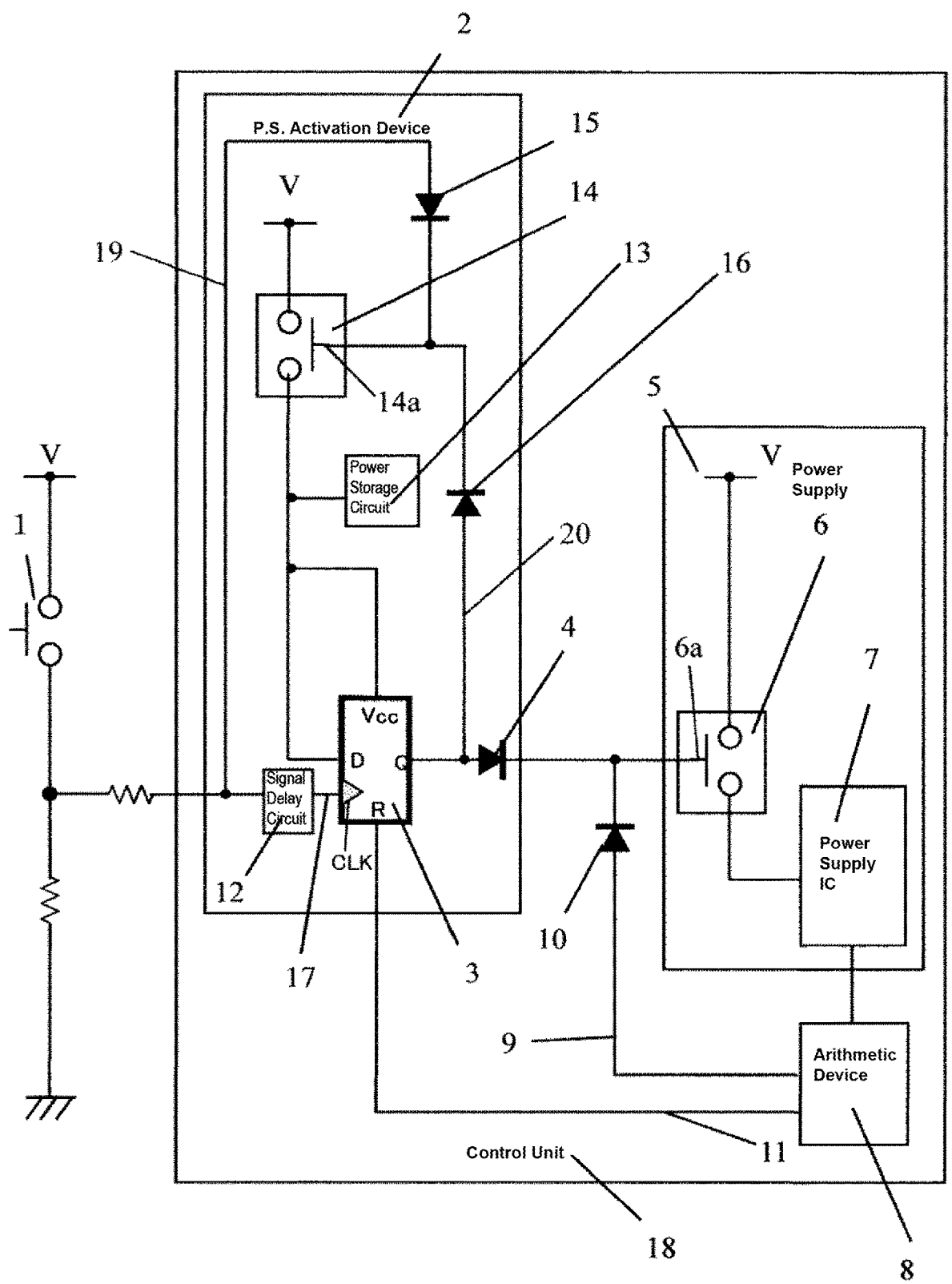
FIG. 3 is a diagram illustrating a circuit configuration according to a second embodiment of the present invention.
Figure 4:
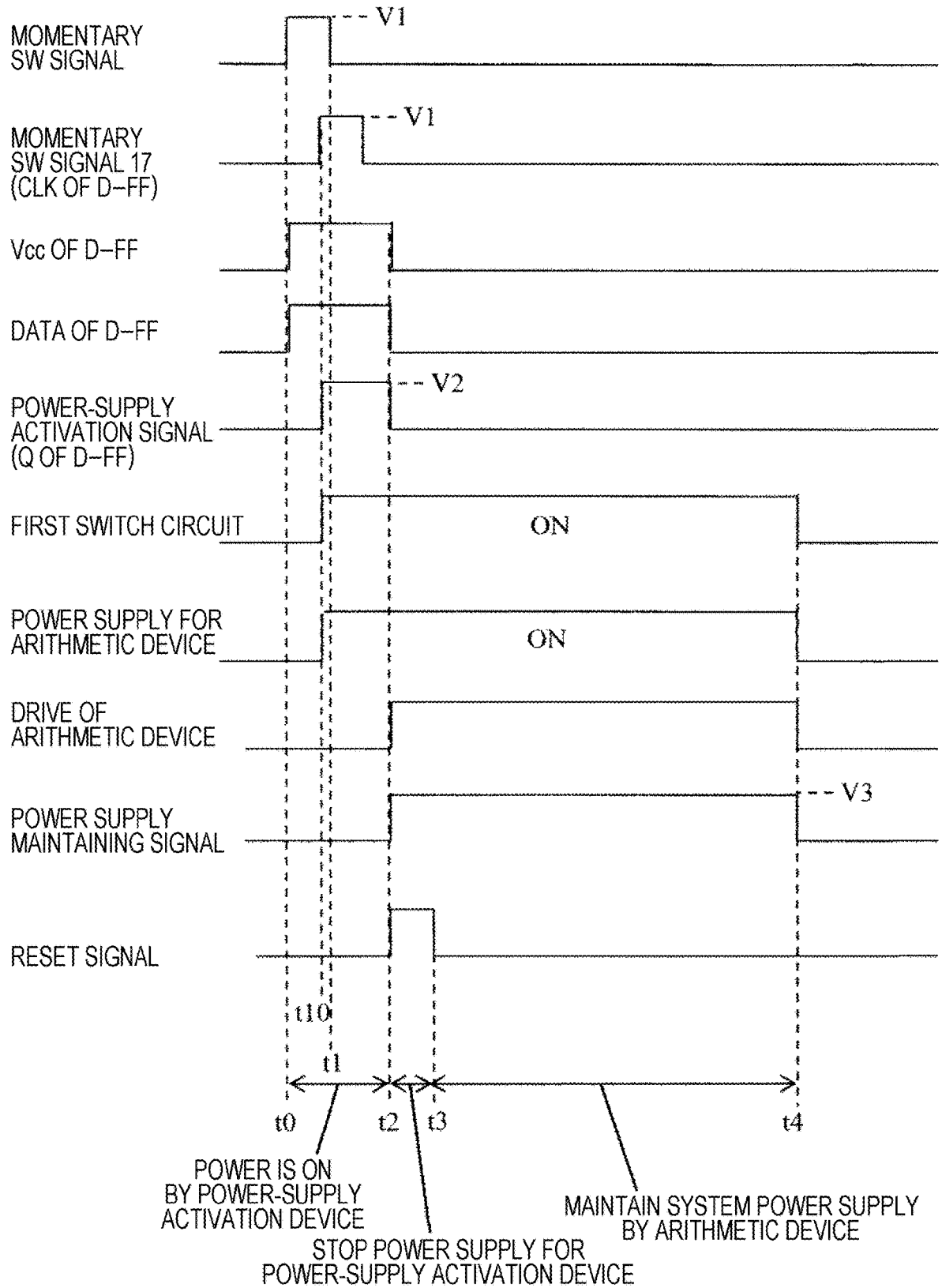
FIG. 4 is a timing chart according to the second embodiment of the present invention.

FIG. 3 illustrates a circuit configuration according to a second embodiment of the present invention, and FIG. 4 illustrates a timing chart to implement FIG. 3. The circuit configuration includes a signal delay circuit 12, a power storage circuit 13, a second switch circuit 14, a third current direction limiting diode 15, a fourth current direction limiting diode 16, and a delayed-momentary-switch-signal transmission line 17, in addition to the circuit configuration of FIG. 1.

The signal delay circuit 12 is a circuit such as an RC circuit formed by, for example, a resistor and a capacitor to delay rising timing of a pulse caused by a potential difference between on and off of the momentary switch 1. In other words, the signal delay circuit 12 delays an input signal from outside.

The power storage circuit 13 is a circuit, such as a capacitor element, for temporarily supplying power to the D-FF 3 when the second switch circuit 14 is turned off.

The second switch circuit 14 is a switch circuit for controlling power supply to the D-FF 3. In other words, the second switch circuit 14 (second switch) includes a second control terminal 14a and turns on/off power supplied to the power-supply activation device 2 in accordance with the potential of the second control terminal 14a. An external-input transmission signal line 19 (third signal line) transmits an input signal from outside to the second control terminal 14a.

The third current direction limiting diode 15 is an element placed between the second switch circuit 14 and a portion between the signal delay circuit 12 and the momentary switch 1 located on the outside. Thus, current flowing to the second switch circuit 14 is prevented from flowing back to both of the signal delay circuit 12 and the momentary switch 1 located on the outside.

The fourth current direction limiting diode 16 is an element placed between the second switch circuit 14 and a portion between the output Q of the D-FF 3 and the first current direction limiting diode 4. Thus, current flowing to the second switch circuit 14 is prevented from flowing back to both of the output Q of the D-FF 3 and the first current direction limiting diode 4.

The delayed-momentary-switch-signal transmission line 17 is a signal line for transmitting a pulse signal from the momentary switch 1 delayed by the signal delay circuit 12, to the clock input portion CLK of the D-FF 3.

When the momentary switch 1 located outside the control unit 18 is turned on (timing t=t0, FIG. 4), potential V1 upstream of the momentary switch 1 is applied to the signal delay circuit 12 and the second switch circuit 14 while the momentary switch 1 is turned on (t0 t t1). At this time, when a switch of the second switch circuit 14 is turned on by the potential of the momentary switch 1, power is supplied to the power storage circuit 13, Vcc and the data input portion D of the D-FF 3.

Furthermore, the potential V1 upstream of the momentary switch 1 is applied to the clock input portion CLK of the D-FF 3 at timing (t=t10) delayed from the timing of turning on the switch of the second switch circuit 14 by the signal delay circuit 12. Since the power is already supplied to the Vcc and the data input portion D of the D-FF 3 as described above, the potential generated by the momentary switch 1 is recognized as a clock by the clock input portion CLK of the D-FF 3 and data is latched, and the output Q of the D-FF 3 becomes a constant potential V2, as in the first embodiment.

In other words, the D-FF 3 (logic circuit) holds and outputs a power-supply activation signal in synchronization with a delayed input signal, and resets the held power-supply activation signal in synchronization with a reset signal.

The potential V2 of the output Q of the D-FF 3 turns on the first switch circuit 6 and the second switch circuit 14 to supply power to the power supply IC 7 and the arithmetic device 8, as in the first embodiment descried above. In addition, since the output Q of the D-FF 3 turns on the second switch circuit 14, the power supply to the D-FF 3 continues even after the momentary switch 1 is opened.

In other words, a power-supply-activation-device output feedback signal line 20 (fourth signal line) transmits the power-supply activation signal output from the D-FF 3 (logic circuit) to the second control terminal 14a.

As in the first embodiment, the arithmetic device 8 activated by receiving power from the power supply IC 7 maintains the power supply from the power supply device 5 by outputting a power supply maintaining signal. When the reset signal is output to the D-FF 3 (t2≤t≤t3) after the arithmetic device 8 is activated, the output Q of the D-FF 3 is reset, and when the second switch circuit 14 is turned off, output and holding (power-supply activation signal) in the power-supply activation device 2 is reset and power supply to an internal circuit of the power-supply activation device 2 is also stopped.

In other words, when at least one of an input signal from outside and the power-supply activation signal is applied to the second control terminal 14a, the second switch circuit 14 (second switch) turns on power supplied to the power-supply activation device 2. Furthermore, when both of the input signal from outside and the power-supply activation signal are not applied to the second control terminal 14a, the second switch circuit 14 turns off power supplied to the power-supply activation device 2.

In the present embodiment, power supply to the power-supply activation device 2 which is unnecessary when the power supply device 5 and the arithmetic device 8 are activated is stopped to reduce current consumption during monitoring trigger from outside or being on standby, in addition to the effects of the first embodiment.

As described above, according to the present embodiment, it is possible to reduce the power consumption of the power-supply activation device 2 while maintaining the drive of the power supply device 5.

First Application Example

For example, the present invention may be applied to an electronic control device that performs control as described below when a refuel request switch (momentary switch) is pressed.

The electronic control device controls an actuator or the like to open a control valve disposed between a fuel tank and a canister (fuel evaporative gas emission preventing device), release an evaporated gas to the canister, and open a fuel cap when the pressure of the fuel tank becomes substantially 0 kPa (when the pressure of the fuel tank becomes equal to or less than a predetermined threshold value). Thus, it is possible to prevent the evaporated fuel from being released into the atmosphere.

In this application example, the electronic control device can also reduce power consumption of the power-supply activation device while maintaining the drive of the power supply device. Furthermore, even though an engine is stopped (ignition switch is turned off) as in refueling and the power of the electronic control device is off, the electronic control device can be activated.

Second Application Example

For example, the present invention may be applied to an electronic control device that performs control as described below when a signal from a detection switch for detecting opening of a fuel supply lid is input.

The electronic control device opens a control valve disposed between a fuel tank and a canister to cause the canister to adsorb an evaporated gas. Note that an evaporation check valve may be provided in a fuel nozzle guide. Thus, it is possible to prevent the evaporated fuel from being released into the atmosphere.

In this application example, the electronic control device can also reduce power consumption of the power-supply activation device while maintaining the drive of the power supply device. In particular, when the electronic control device is a digital computer, the current consumption thereof increases, but according to the present application example, it is not necessary to cause the electronic control device (digital computer) to wait to perform the above control. Therefore, the current consumption thereof can be reduced.

Note that the present invention is not limited to the above embodiments, and can include various alterations and modifications. For example, the above embodiments are described in detail for ease of understanding the present invention, and therefore, the present invention is not necessarily limited to a configuration including all of the configurations described above. Furthermore, part of a configuration of an embodiment can be replaced with a configuration of another embodiment, and a configuration of an embodiment can be added to a configuration of another embodiment. Still furthermore, for part of the configurations of the respective embodiments, additions, eliminations, or substitutions of another configuration may be made.

In the above embodiment, the D-FF is used, but another logic circuit may be used.

In addition, the configurations, functions, or the like described above may be partially or wholly achieved by hardware, such as a designed integrated circuit. In addition, the configurations, functions, or the like described above may be achieved with software by interpreting and executing programs to achieve functions by a processor (arithmetic device). Information such as a program, a table, a file, or the like that achieves each function can be stored in a recording device, such as a memory device, a hard disk, or a solid state drive (SSD), or a recording medium, such as an IC card, an SD card, or a DVD.

The embodiments of the present invention may include the following aspects.

(1) An electronic control device including an arithmetic device, a power supply device for supplying power to the arithmetic device, a power-supply activation device for activating the power supply device, a power supply drive maintaining signal line for transmitting a power supply drive maintaining signal from the arithmetic device to the power supply device, and a reset signal line for transmitting a reset signal from the arithmetic device to the power-supply activation device.

(2) An electronic control device including an arithmetic device, a power supply device for supplying power to the arithmetic device, and a power-supply activation device for activating the power supply device, in which the power-supply activation device outputs an activation signal to the power supply device on the basis of an input from outside, the power supply device supplies power to the arithmetic device when an activation signal is input, the arithmetic device outputs a power supply drive maintaining signal to the power supply device when power is supplied from the power supply device, and the arithmetic device outputs a reset signal to the power-supply activation device after activation.

(3) The electronic control device according to (2), in which a D-FF with reset or an FF is used for the power-supply activation device.

(4) The electronic control device according to (2), further including a signal delay circuit for delaying an input signal from outside, a switch circuit for switching power supply and stop of the power supply to the power-supply activation device, and an external-input transmission signal line for transmitting an input from outside to the switch circuit, and a power-supply-activation-device output feedback signal line for transmitting an output from the power-supply activation device to the switch circuit, in which the switch circuit supplies power to the power-supply activation device on the basis of an input from outside, and the delay circuit inputs a delayed input signal from outside to the power supply activation device and outputs, on the basis of an input from outside via the delay circuit, an activation signal to the power supply device and a switch-on signal to the switch circuit by using the power-supply-activation-device output feedback signal line, in which the switch circuit continues power supply to the power supply activation circuit by using the switch-on signal when there is no input from outside, and power supply to the power supply activation circuit is stopped by turning off the switch circuit by using the reset signal.

According to the above embodiments (1) to (4), unnecessary operation of the power-supply activation device can be stopped after the power supply device and the arithmetic device are activated, and unnecessary current consumption can be reduced. In other words, separating the functions of the power-supply activation device and the power supply maintaining device enables resetting the power-supply activation device alone, and resetting the power-supply activation device while maintaining the power supply to the system enables reduction of current consumption caused by the power-supply activation device.

REFERENCE SIGNS LIST 1 momentary switch
2 power-supply activation device
3 D-FF
4 first current direction limiting diode
5 power supply device
6 first switch circuit
7 power supply IC
8 arithmetic device
9 power supply maintaining signal line
10 second current direction limiting diode
11 reset signal line
12 signal delay circuit
13 power storage circuit
14 second switch circuit
15 third current direction limiting diode
16 fourth current direction limiting diode
17 delayed-momentary-switch-signal transmission line
18 control unit
19 external-input transmission signal line
20 power-supply-activation-device output feedback signal line

The invention claimed is:

1. An electronic control device comprising:
an arithmetic device;
a power supply device configured to supply power to the arithmetic device;
a power-supply activation device configured to activate the power supply device;
a first signal line configured to transmit a power supply drive maintaining signal for maintaining drive of the power supply device, from the arithmetic device to the power supply device; and
a second signal line configured to transmit a reset signal for resetting the power-supply activation device, from the arithmetic device to the power-supply activation device,
wherein
the power-supply activation device is configured to output a power-supply activation signal, for activating the power supply device, to the power supply device, on the basis of an input signal from outside,
the power supply device is configured to supply power to the arithmetic device during a period in which the power-supply activation signal is input, and
the arithmetic device is configured to, after activation with power supplied from the power supply device, output the power supply drive maintaining signal to the power supply device and output a reset signal to the power-supply activation device,
wherein
the power supply device includes a first switch, which has a first control terminal to which the power-supply activation signal and the power supply drive maintaining signal are applied, to turn on/off power supplied to the power supply device in accordance with a potential of the first control terminal.

2. The electronic control device according to claim 1, wherein
the power supply device is configured to supply power to the arithmetic device during a period in which the power supply drive maintaining signal is input.

3. The electronic control device according to claim 2, wherein
the power-supply activation device is configured to stop output of the power-supply activation signal, when the reset signal is input.

4. The electronic control device according to claim 1, wherein
the power-supply activation device includes a logic circuit configured to hold and output the power-supply activation signal in synchronization with an input signal from outside and reset the held power-supply activation signal in synchronization with the reset signal.

5. The electronic control device according to claim 1, wherein the power-supply activation device includes:

a second switch which has a second control terminal to turn on/off power supplied to the power-supply activation device in accordance with potential of the second control terminal;

a signal delay circuit configured to delay the input signal from outside;

a logic circuit configured to hold and output the power-supply activation signal in synchronization with the delayed input signal and reset the held power-supply activation signal in synchronization with the reset signal;

a third signal line configured to transmit the input signal from outside to the second control terminal; and a fourth signal line configured to transmit the power-supply activation signal output from the logic circuit to the second control terminal, and the second switch is configured to turn on power supplied to the power-supply activation device when at least one of the input signal from outside and the power-supply activation signal is applied to the second control terminal, and to turn off power supplied to the power-supply activation device when both the input signal from outside and the power-supply activation signal are not applied to the second control terminal.

* * * * *